Oct. 12, 1971    E. L. GLASS    3,611,518
APPARATUS FOR REMOVING CURED CONCRETE ARTICLES FROM PALLETS
Original Filed Aug. 11, 1967    15 Sheets-Sheet 1

INVENTOR
ERCELL LLOYD GLASS

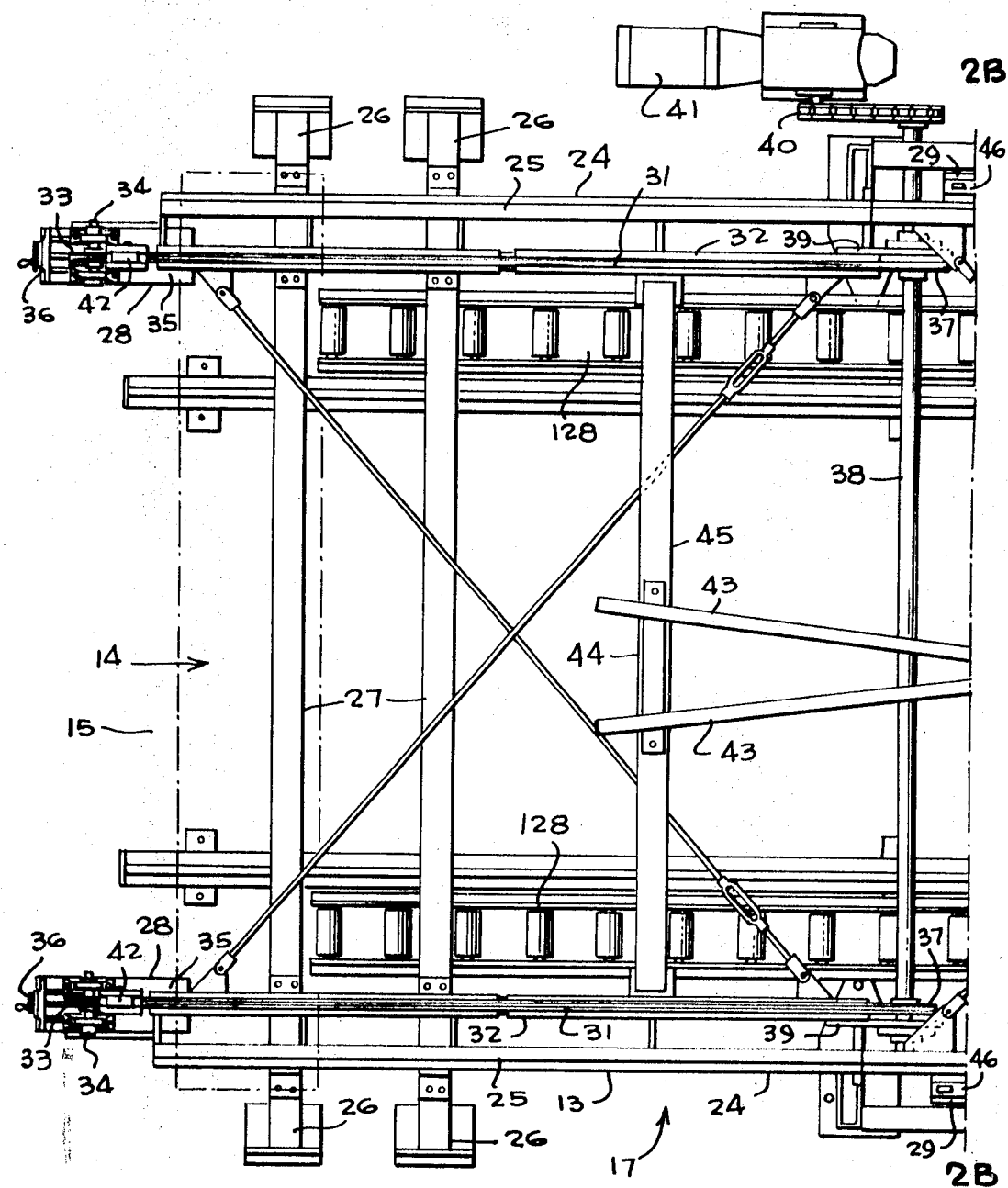
Fig-2-A

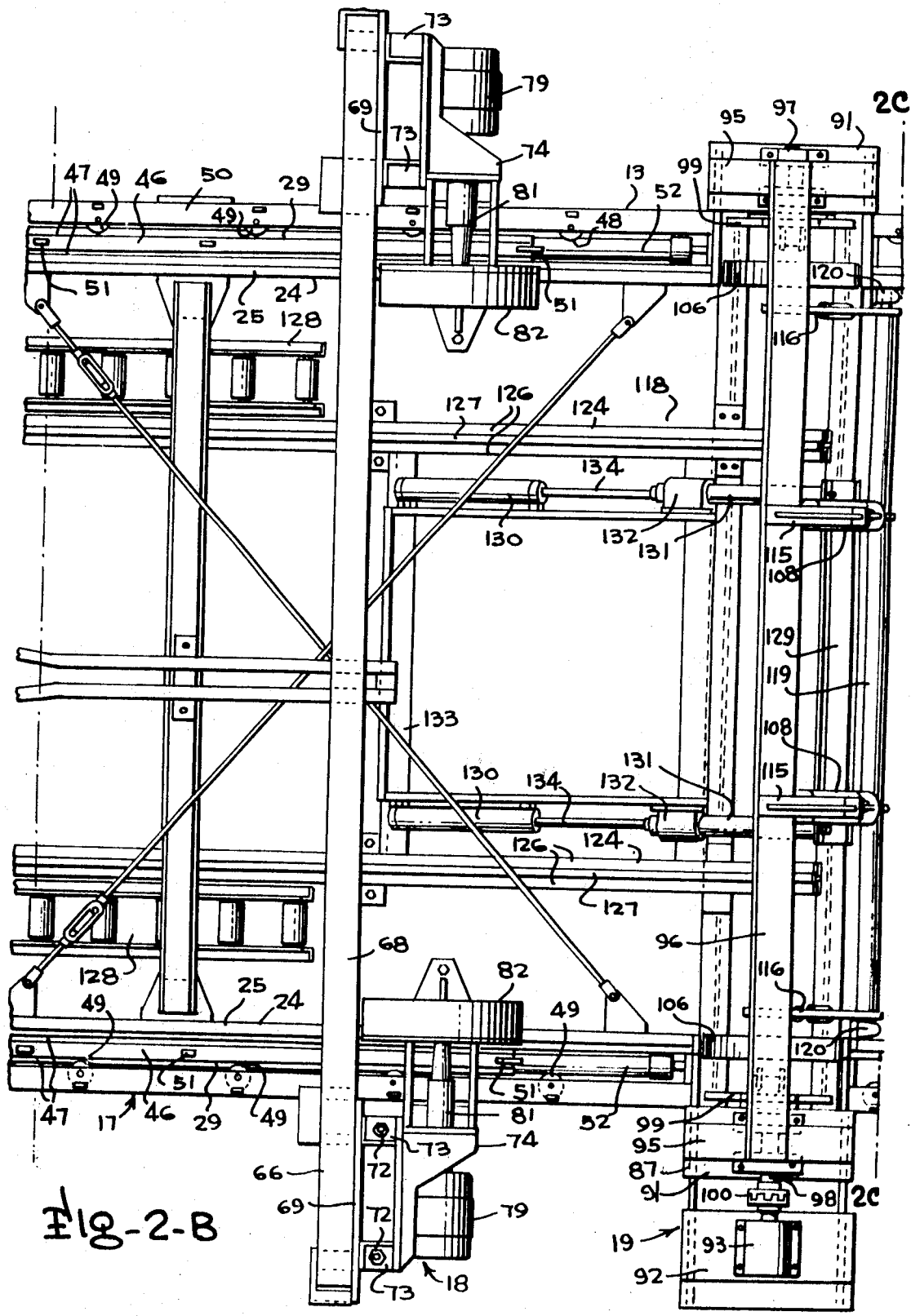

Oct. 12, 1971  E. L. GLASS  3,611,518
APPARATUS FOR REMOVING CURED CONCRETE ARTICLES FROM PALLETS
Original Filed Aug. 11, 1967  15 Sheets-Sheet 4
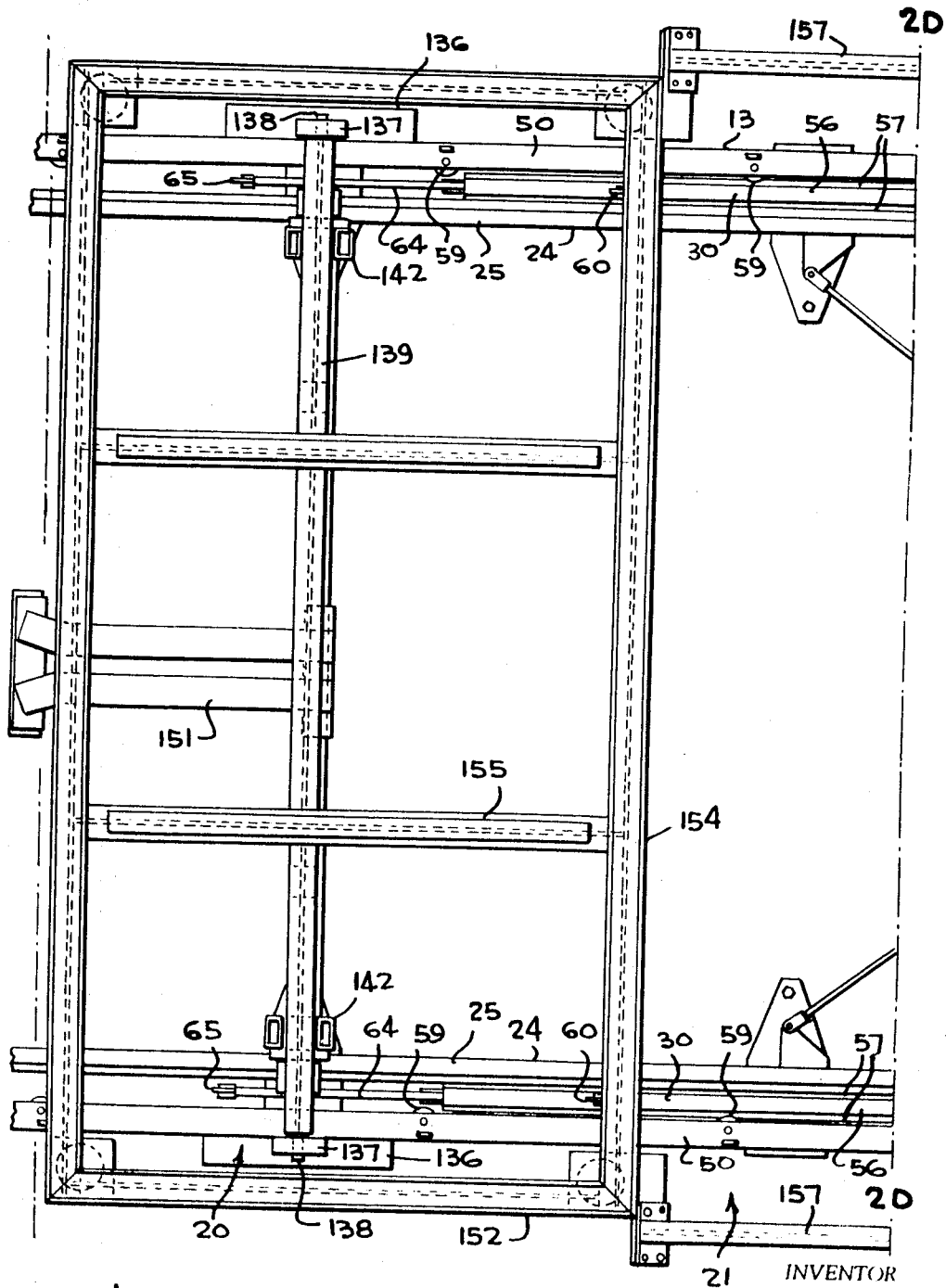
Fig-2C  INVENTOR
ERCELL LLOYD GLASS

INVENTOR
ERCELL LLOYD GLASS

INVENTOR
ERCELL LLOYD GLASS

INVENTOR
ERCELL LLOYD GLASS

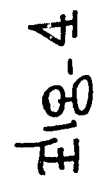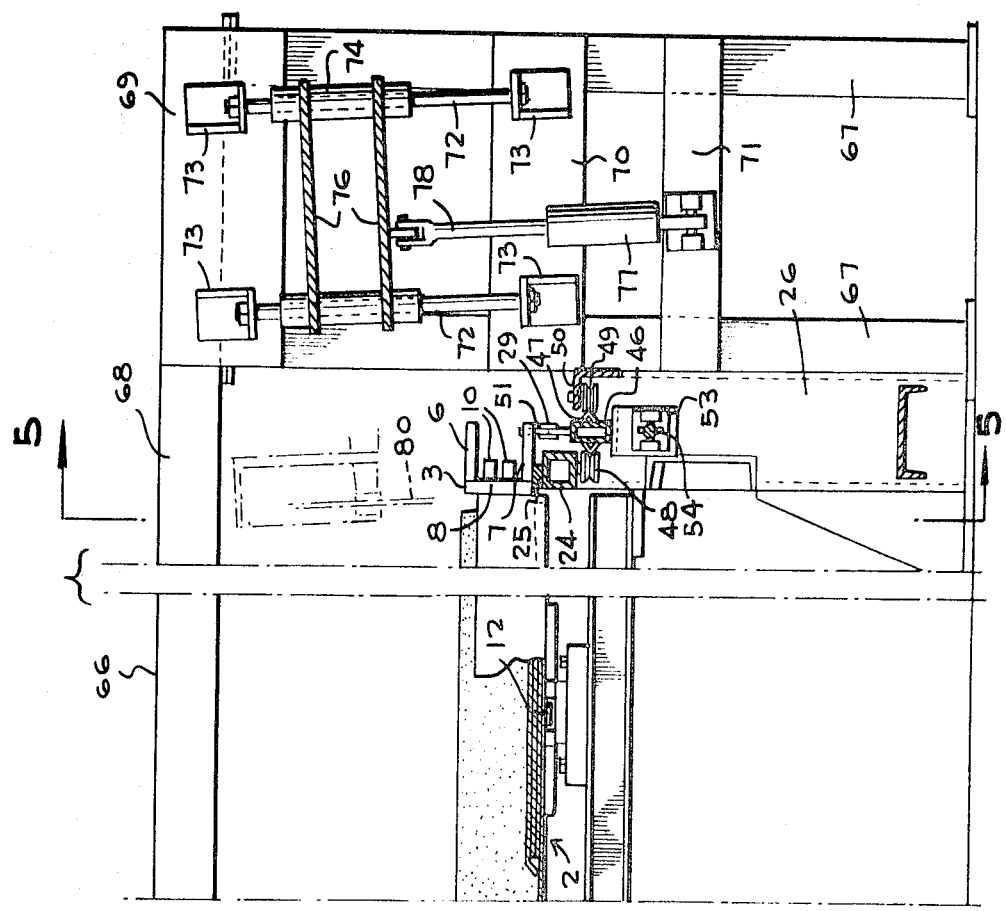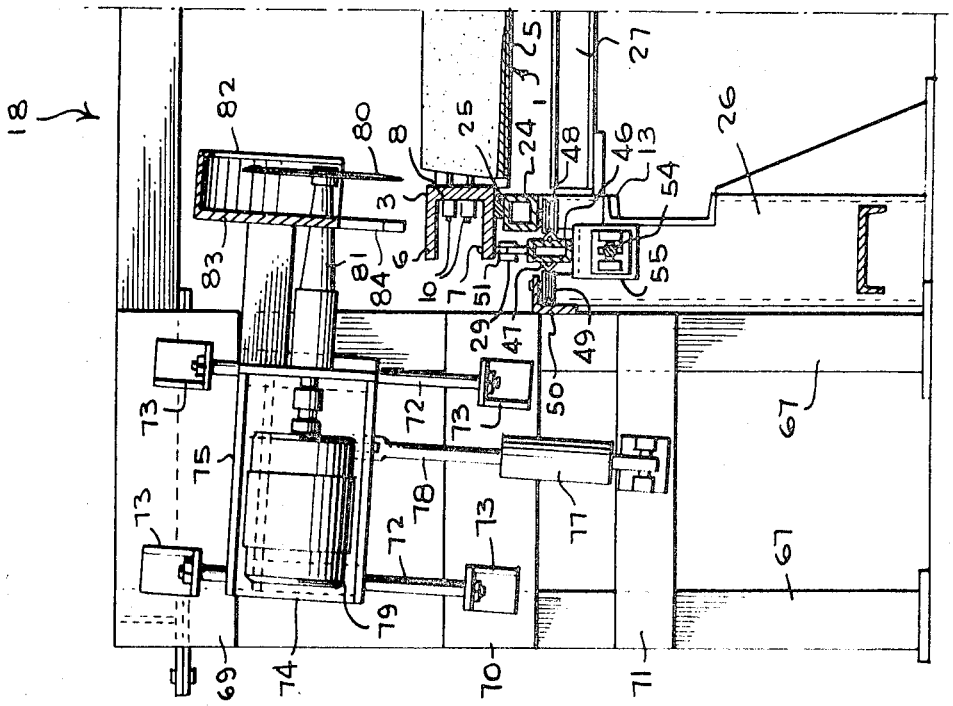

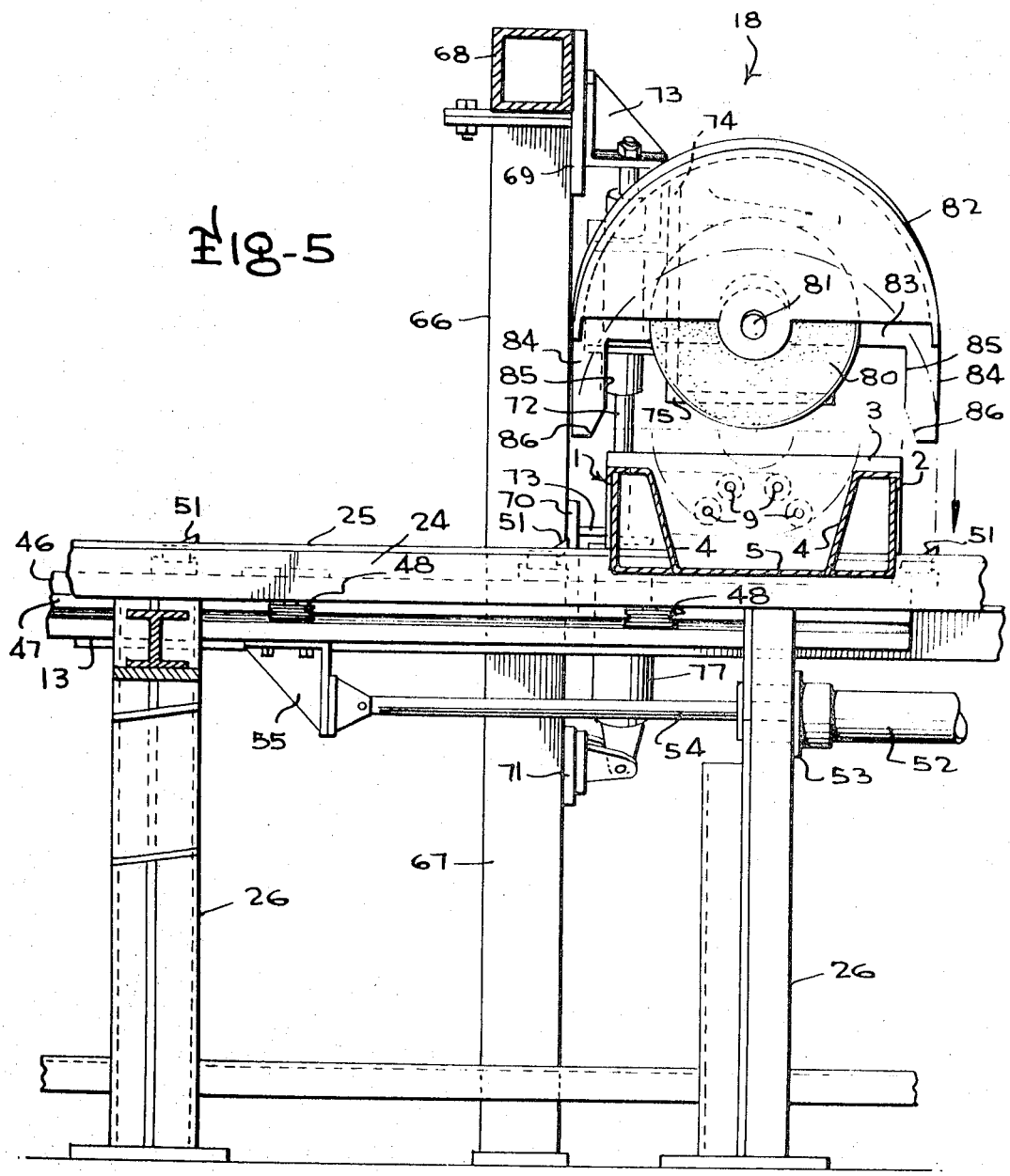

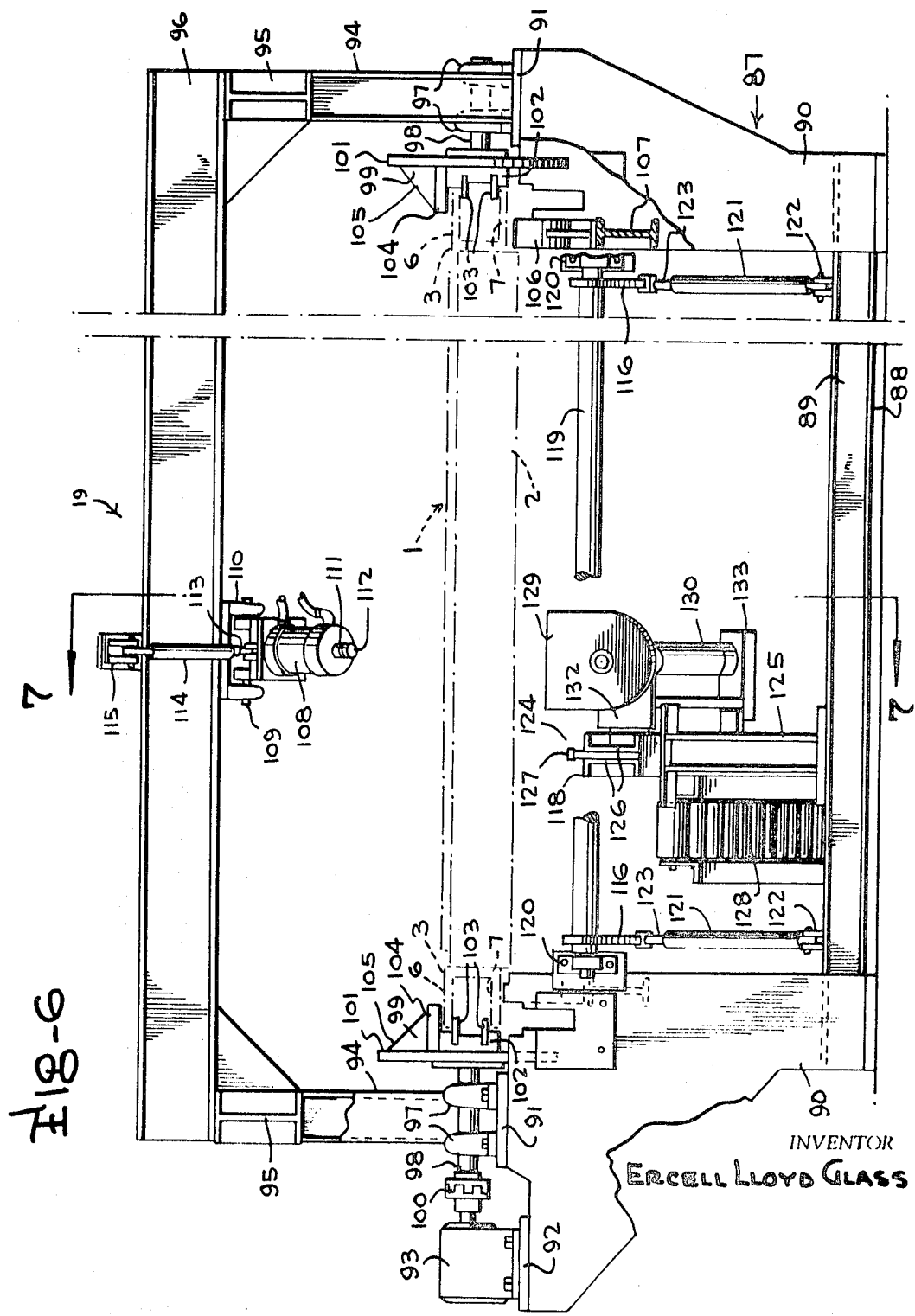

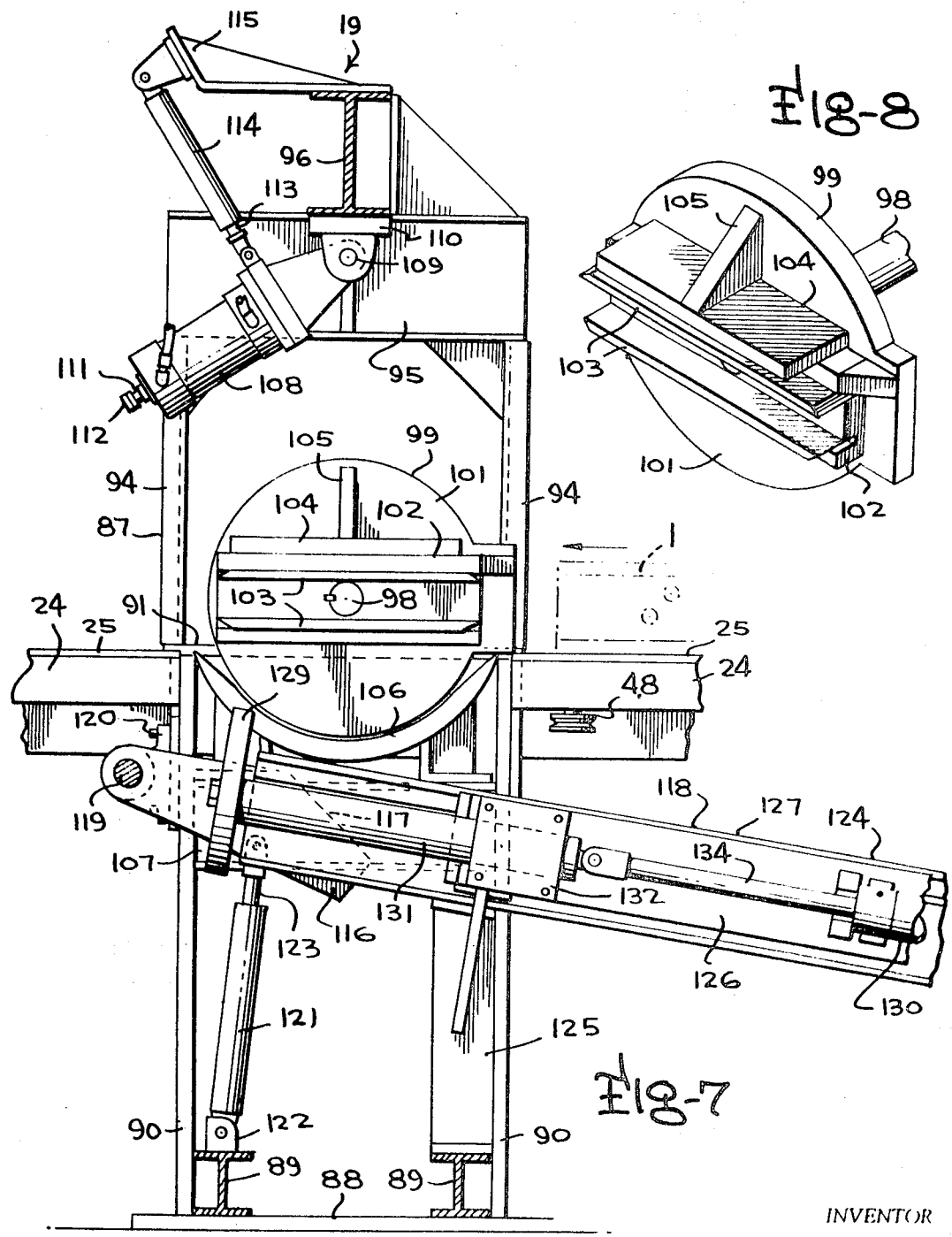

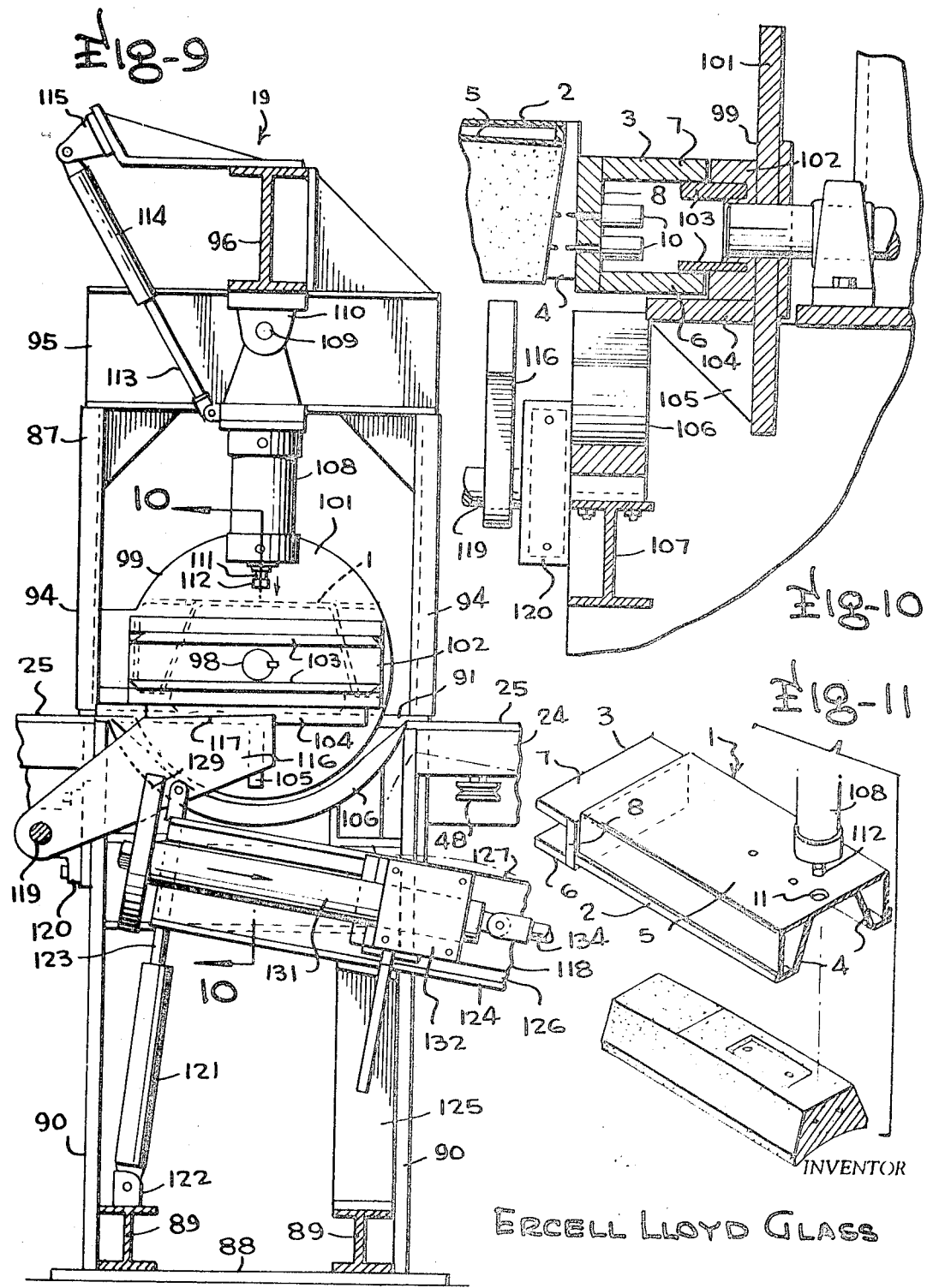

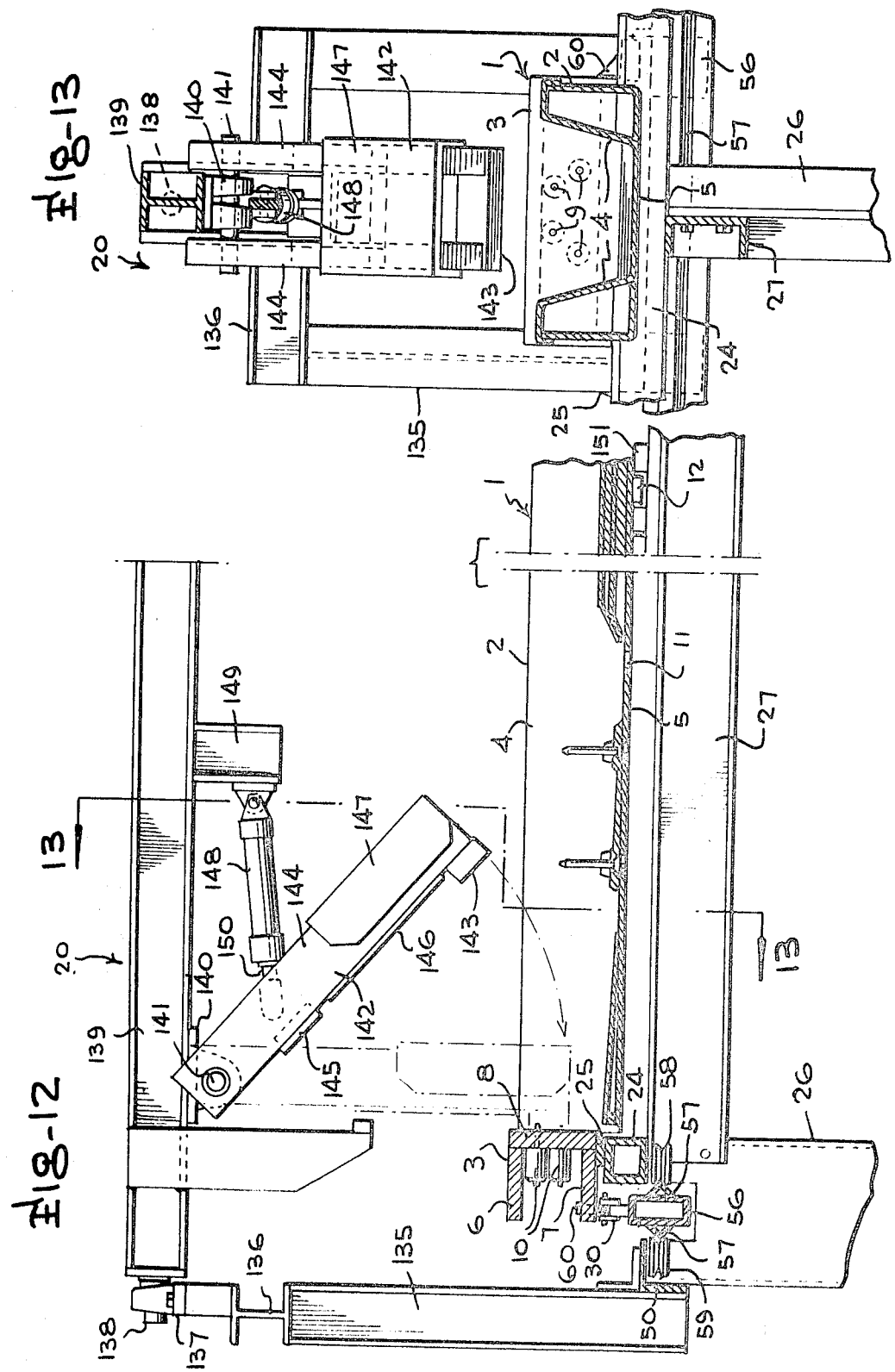

United States Patent Office 3,611,518
Patented Oct. 12, 1971

3,611,518
APPARATUS FOR REMOVING CURED CONCRETE ARTICLES FROM PALLETS
Ercell L. Glass, Tampa, Fla., assignor to American Concrete Crosstie Corporation, Tampa, Fla.
Original application Aug. 11, 1967, Ser. No. 660,133. Divided and this application Oct. 30, 1969, Ser. No. 872,662
Int. Cl. B28b *13/06*
U.S. Cl. 25—120                                6 Claims

ABSTRACT OF THE DISCLOSURE

Apparatus for removing cured concrete articles, particularly prestressed concrete articles, from pallets in which they are cast and cured which includes feeding and guiding pallets containing cured articles into predetermined position, cutting by saws the stressing cables to free castings from the pallets, inverting the pallets beneath plungers which enter openings in the pallet bases and press castings from the pallets onto receiving means which lower them to an accumulating area, reverting the pallets to their previous orientation, driving the cut cable ends from the pallet retaining means by swinging hammers, and cleaning, oiling and restranding the empty pallets, the pallets being moved step by step from one operating procedure station to the next from entering into the apparatus to exit therefrom.

---

The present application constitutes a division of my application Ser. No. 660,133, filed Aug. 11, 1967.

BACKGROUND OF THE INVENTION

This invention relates to an apparatus for removing cured concrete articles from pallets, or molds, in which they have been cast and cured, particularly adapted for the removal of prestressed concrete articles from pallets in which stressing cables are held under tension during casting and curing of the concrete.

In casting prestressed concrete articles, stressing cables in desired pattern arrangement are strung between headers of a mold and attenuated to the extent required to place them under predetermined tension. While the cables are held tensioned, the concrete is poured, compressed and cured. The cables are then cut to free the article from the mold, and the article is lifted from the mold.

Two U.S. Pats. No. 3,128,521 and No. 3,305,907, both in the name of Robert S. Baker, are directed to apparatus for automatically placing cables in portable pallets, stressing the cables and holding the cable tension by the pallet, pouring the concrete into a mold formed by the pallet and a mold member, stripping the mold member from the molded article and removing the molded article on the pallet for curing. Pat. No. 3,305,907 goes further and, in addition to the above, discloses apparatus for cutting the cables from the pallet to release the tension to the concrete article to stress it, and apparatus for removing the article from the pallet after the cables are cut.

The article removing means disclosed in Pat. No. 3,305,907 consists of means to engage, and hold, the pallet while the cured article is gripped by a vacuum head and lifted from the pallet. The compression of the concrete into the pallet during molding conforms the article, when cured, so closely to the pallet recess that considerable force is required to separate the two. If the vacuum head pulls free from the article, the entire conveying line must be stopped until the article is removed from the pallet. In addition, the article, when lifted free, must be conveyed by some traveling overhead mechanism to a place of deposit. As the vacuum separating head must hold the article during transport, the movement of pallets to and from the removing station must be timed to separating and conveying actions of the vacuum head.

SUMMARY OF THE INVENTION

The general object of the present invention is to provide improved means for freeing and separating cast concrete articles from pallets in which they are formed and cured.

A more specific object is to provide mechanical means for inverting pallets with cured cast articles in them, and forcefully pressing the articles from the pallets.

A further object is to provide a receiver which is removable to a position underlying a casting to be removed, to receive it and lower it onto a discharge conveyor.

Still another object is the provision of cast article removing mechanism, as set out above, which is part of a conveying system for transporting cured articles in pallets to a cable cutting station, the casting removal station and a cut cable end and anchor chuck jaw removing station, and for transporting the empty pallet along an area where it is prepared for another casting operation.

Yet a further object of the invention is to provide a novel mechanism for removing the cut cable ends and anchor jaws from pallets, after the castings have been taken out.

It is also an object to provide a new method for handling pallets with cured concrete articles in them, to remove the articles, to remove cut cable ends and anchor jaws and to prepare the pallets for a new casting operation.

Other objects of the invention will become apparent from the following description of one practical embodiment thereof, when taken in conjunction with the drawings which accompany, and form part of, this specification.

BRIEF DESCRIPTION OF THE DRAWINGS

FIG. 1 is a top plan view of apparatus embodying the principles of the present invention, depicting a conveyor path along which a plurality of operating stations are arranged in spaced relation;

FIGS. 2A, 2B, 2C and 2D, together, illustrate the apparatus in top plan on a greatly enlarged scale;

FIG. 4 is a transverse, vertical section through the machine, taken substantially on the line 4—4 of FIG. 3B, illustrating the mechanism at the saw station of the apparatus;

FIG. 5 is a fragmentary longitudinal section, taken on the line 5—5 of FIG. 4, and shown on an enlarged scale;

FIG. 6 is a vertical, transverse section, taken on the line 6—6 of FIG. 3B, illustrating the apparatus at the casting removal station;

FIG. 7 is a fragmentary longitudinal section, taken on line 7—7 of FIG. 6 and being shown on an enlarged scale with the parts in position to receive a pallet;

FIG. 8 is a perspective view of one of the pallet header receiving, and inverting, members employed at the casting removal station;

FIG. 9 is a view similar to FIG. 7, but with a pallet at the station in inverted position and the elements in position to remove the casting from the pallet;

FIG. 10 is a fragmentary section taken on the line 10—10 of FIG. 9;

FIG. 11 is a fragmentary perspective view illustrating the manner of removing a casting from a pallet;

FIG. 12 is a fragmentary, vertical, transverse section, taken on the line 12—12 of FIG. 3C, illustrating mechanism at the station for removing the cut cable ends and anchor chuck jaws, the parts being shown on an enlarged scale;

FIG. 13 is a fragmentary longitudinal section, taken on the line 13—13 of FIG. 12.

DESCRIPTION OF THE PREFERRED EMBODIMENT

Figure 2D:
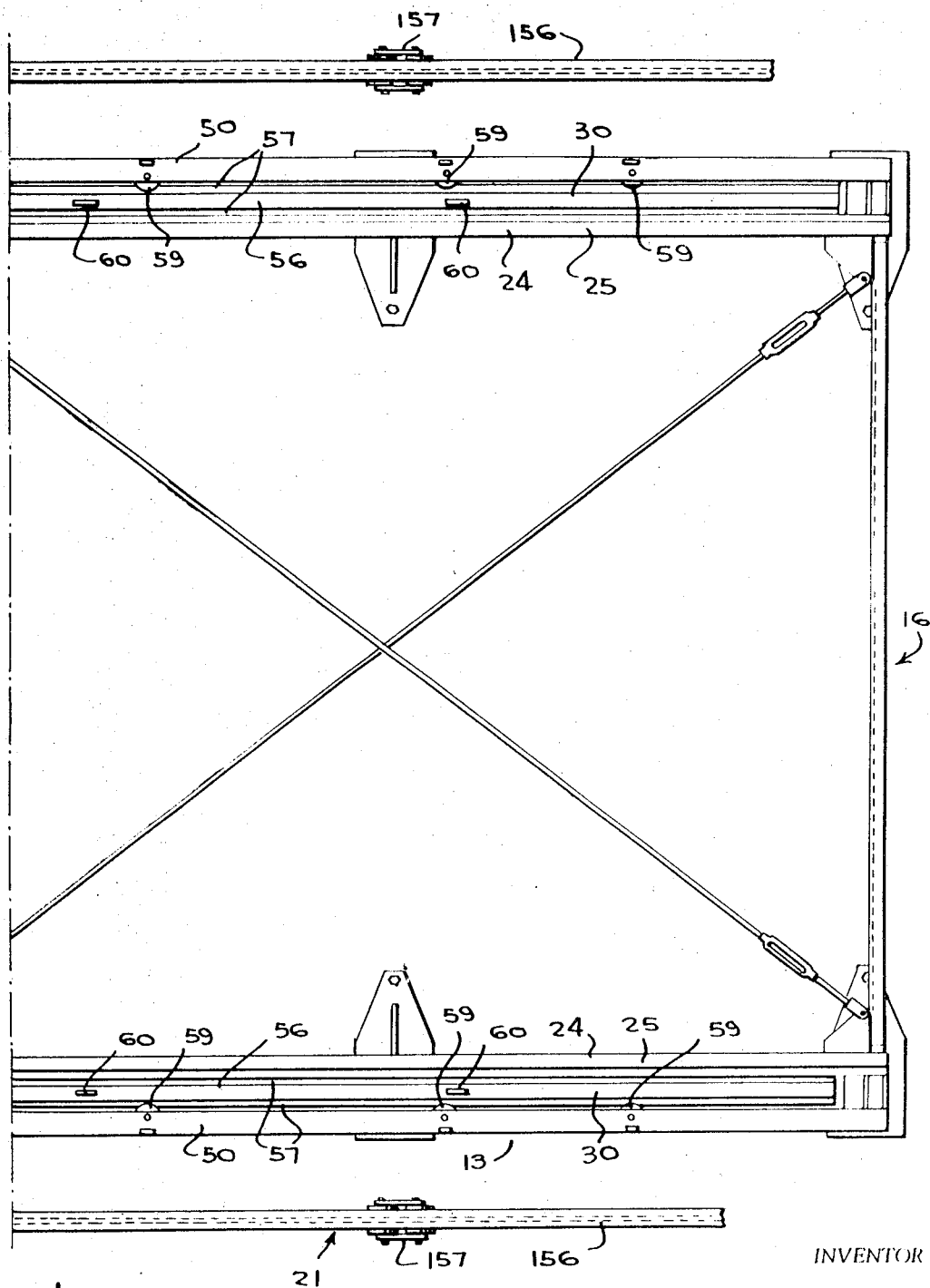
Figure 3A:
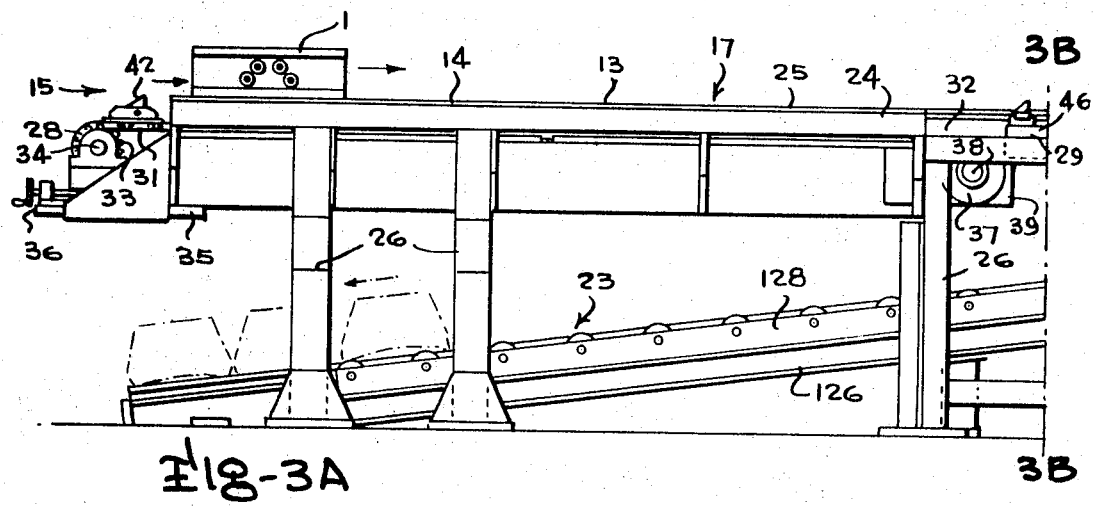
FIGS. 3A, 3B, 3C and 3D, together, show a side elevation of the apparatus shown in FIG. 1.
Figure 3B:
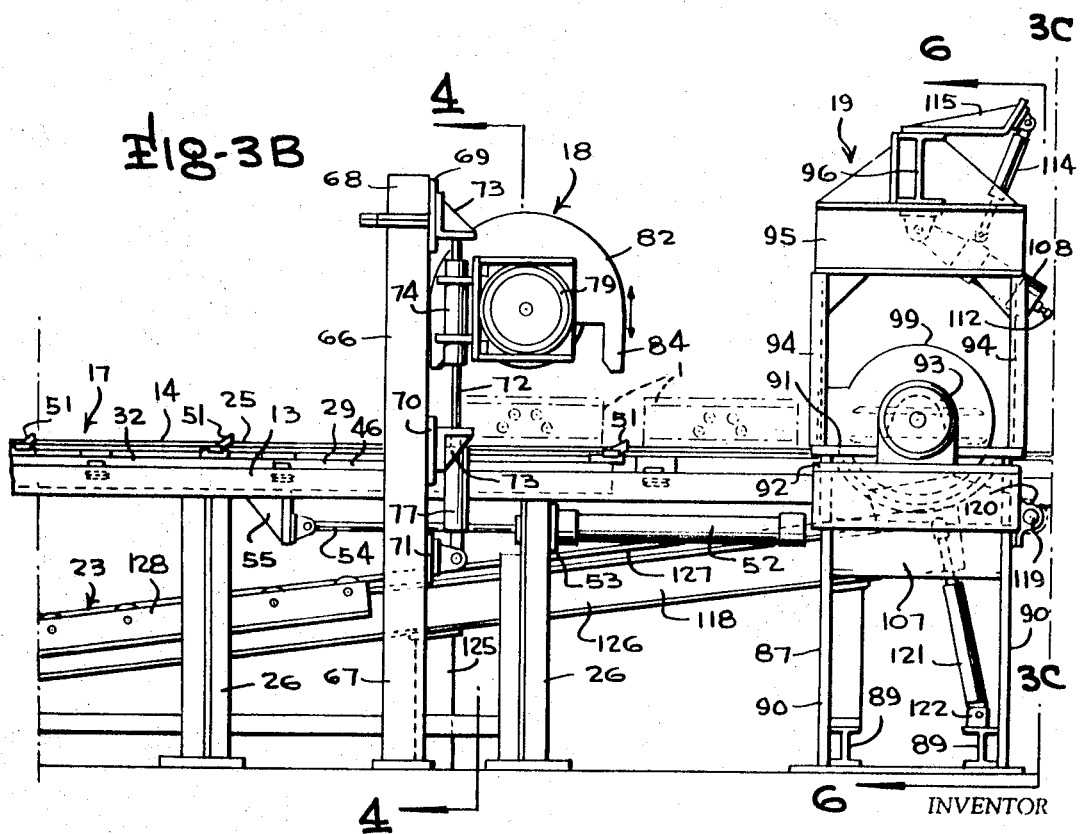
Figure 3C:
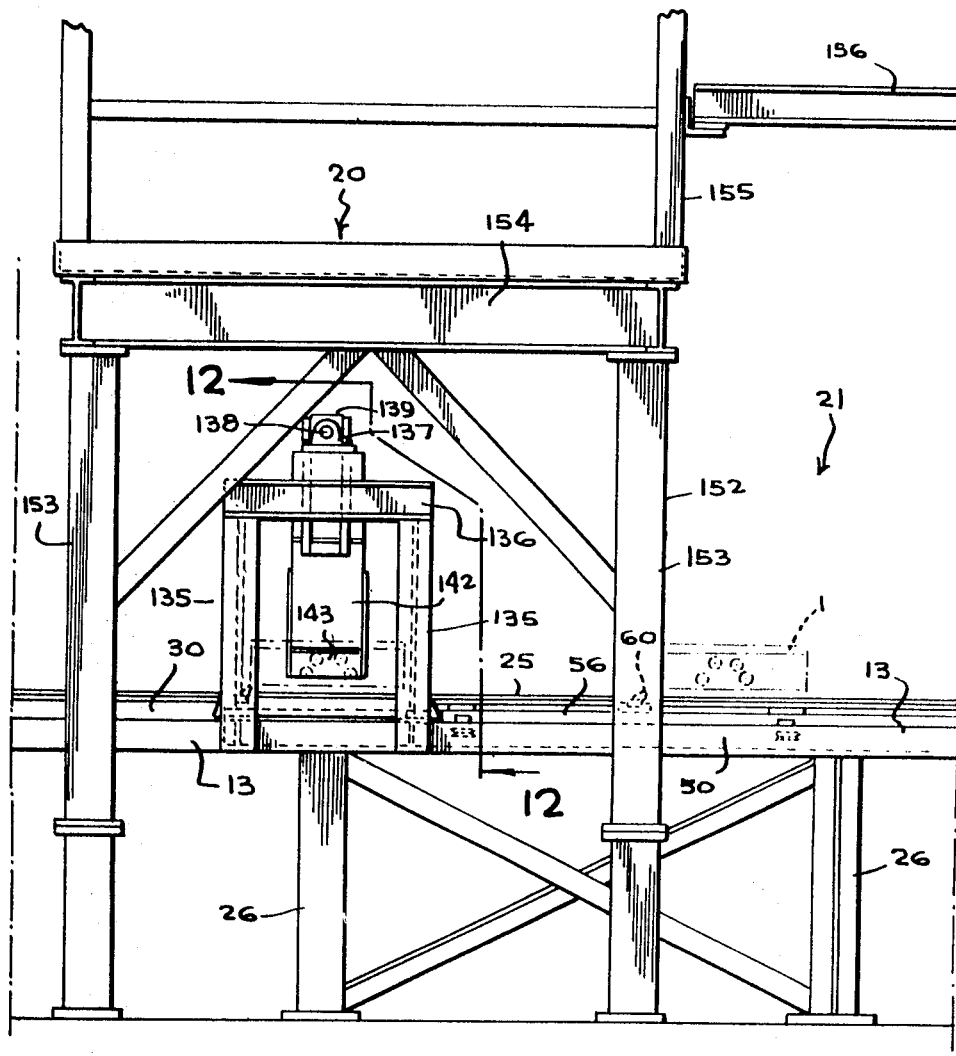
Figure 3D:
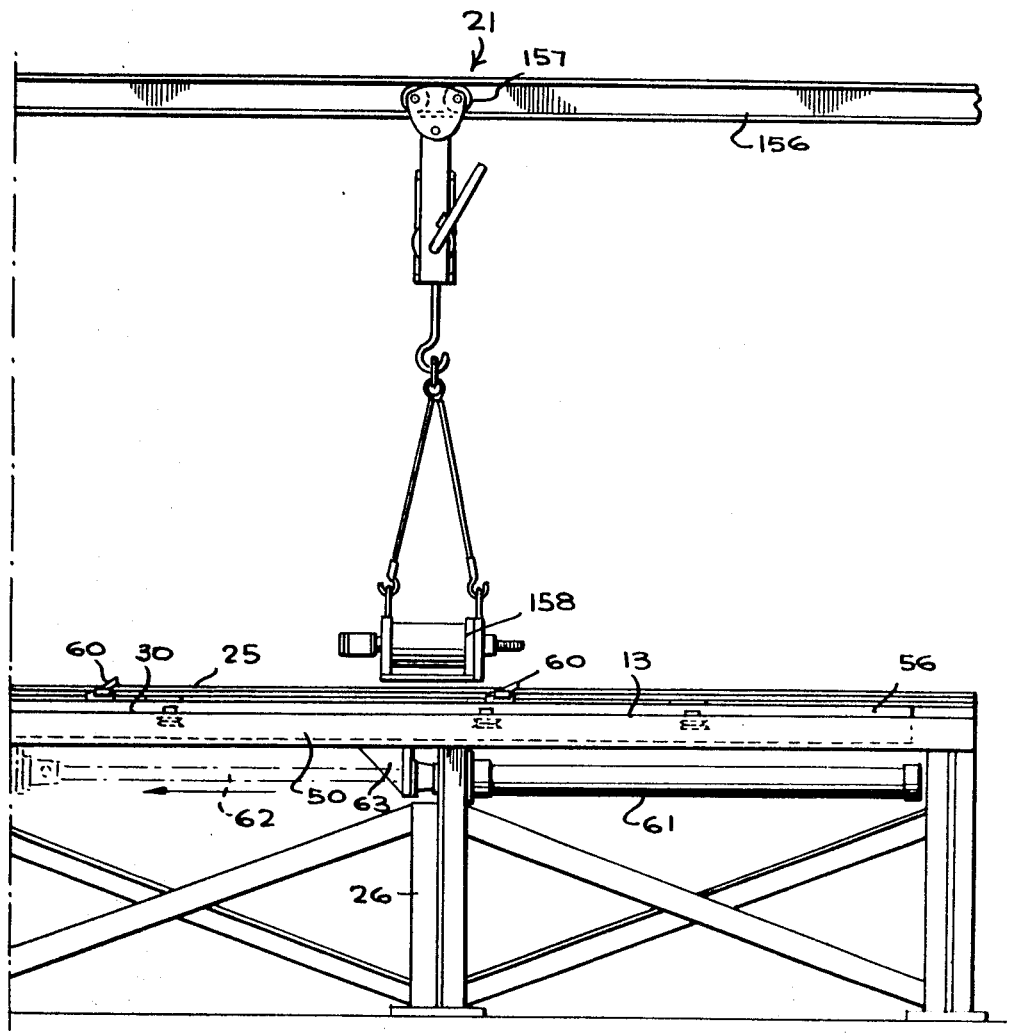

The present invention is concerned with the handling of pallets upon which concrete is poured and molded, and the molded member supported until cured. The pallets can take any shape, depending upon the contour of the article to be cast, but, for convenience, a pallet has been illustrated and will be described for use in making prestressed railway ties.

Referring to FIGS. 11, 12 and 13, it will be seen that the pallet 1 is composed of a body 2 with headers 3 at each end. The body is formed as an upwardly opening channel, having box type sides 4 and a bottom 5. The inner walls of the box sides and the bottom are made in desired contour to produce a casting of predetermined shape. Headers 3 are in the form of outwardly opening channels, having top and bottom flanges 6 and 7 and an interconnecting back wall 8. The back wall has a plurality of openings 9, in desired pattern, to receive the ends of cables used for stressing the concrete members. Anchors 10, of the usual type having a plurality of movable chuck jaws, are fixed to the outer sides of the back walls 8 of the headers in alignment with the openings 9, so as to receive and grip the ends of cables which project through the openings 9. The bottom of the body of the pallet will have several openings 11, through which the surface of the cast article will be visible, and through which the surface of the cast article can be contacted. There is also a raised guide 12 on the bottom 5 of the pallet to provide means for positively locating the pallet transversely of the apparatus which will be described.

The present invention proposes to remove cured ties from pallets, such as pallets 1, and prepare the pallets to receive another casting by first cutting the stressing cables between the tie ends and the pallet headers (see FIG. 4) to impose the cable tension upon the tie and to free the tie from attachment to the pallet. This is done by cutting first the two top strands (see FIG. 5) then cutting the two bottom strands. These strands are cut first at one side of the tie, then the other. The cut ends of cable remain locked in the anchors 10. The pallet, with the tie in place, is next inverted, and held against downward movement, while pressure is exerted against the surface of the tie through the punch-out openings 11 to forcibly eject the tie from the pallet. As the tie falls free of the pallet, it is caught and gently lowered onto a repository. The pallet is then reverted to its original position, and the cut ends of cable and the chuck jaws which hold them are driven from the anchor housing by delivering a blow against the cut cable ends. The steps of cleaning, oiling, restranding and tensioning the strands are then followed to prepare the pallet for a new casting.

FIG. 1 of the drawings shows a general top plan view of apparatus for carrying out the above method. It consists of a frame 13, which defines an elongated pallet path 14 having an entrance end 15 and an exit end 16, and along which are positioned a plurality of operating stations. These include a pallet advancing and positioning station 17, a cable cutting station 18, a pallet inverting and tie removing station 19, a cable end removing station 20, and a pallet preparing station 21. Means, to be described, which will be under selective control of an operator, are provided for advancing pallets along the path to, and through, the various stations where the several operations are performed. The apparatus also includes a tie receiving and lowering mechanism 22, located beneath the station 19, and a separated tie accumulating station 23 below the pallet path, extending substantially the full length of the stations 17, 18 and 19.

The pallet path 14 is defined by a pair of transversely spaced box-like rails 24 having wear plates 25 extending along their tops. The rails are so spaced that the wear plates underlie the headers of pallets placed upon them (see FIG. 4). The rails are continuous throughout the machine, except for a short area at the inverting and tie removing station 19, where they are replaced by a portion of that mechanism, as will be described. The rails are supported upon legs 26, forming part of the frame 13, and the legs are interconnected by suitable transverse beams 27. These elements, together with the special framing at the several stations, which will be described, complete the main frame 13.

The pallets are placed upon the rails 24 at the entrance end 15 of the pallet path, and they are advanced along the length of the apparatus by means of an advancing chain 28 which moves the pallets through the advancing and positioning station 17, an advancing rack 29 which moves the pallets through the cable cutting station 18 and to the inverting and tie removing station 19, and an advancing rack 30 which moves the pallets from the tie removing station 19 and through the cable end removing station 20 and pallet preparing station 21.

The chain advance 28 consists of two separate chains 31, one adjacent each of the rails 24 throughout the advancing and positioning station 17. The chains ride in channel guides 32 which are mounted upon transverse beams 27 between the legs 26 of the station 17. At the forward end of the apparatus, chains 31 pass around sprockets 33 on shafts 34, mounted in suitable bearings on a plate 35 which extends forwardly from the ends of the guides 32. Suitable chain tightening means 36 may be mounted on the plate also. The rear ends of the chains pass around sprockets 37 carried by a drive shaft 38, mounted in plates 39 projecting rearwardly from the guides 32. Shaft 38 can be driven in any desired manner, such as by chain 40 which passes around sprockets on a motor unit 41 and the drive shaft 38. Each chain carries a dog 42 which projects upwardly from the top flight a sufficient distance to engage pallets seated on the rails 24. Although not shown in detail, the dogs will be freely depressible so as to move downwardly and under pallets when the chain is retracted, yet spring to upright, pallet-engaging position when free from a pallet.

One or more pallets bearing cured ties may be placed upon the rails 24 by means of a fork lift, or other suitable machine, and when the motor 41 is started, by means of electric circuits to be described, the dogs 42, being in alignment, will engage the rearmost pallet of the group and move the pallets along the rails. If the pallets are canted in their positions, the pressure of the dog first contacting the pallets will force the pallets into proper alignment normal to the extent of the rails. As the pallets move along the rails, their downwardly projecting guides 12 will enter between the spaced, converging blades 43 of a sword 44. This will shift the pallets transversely of the path, if required, to cause the guides 12 to enter the parallel sections 45 of the blades. When the guide 12 is within the parallel section of the guide, the pallets will be precisely positioned transversely of the pallet path. The sword has its converging blades 43 mounted upon a crossbrace 45 between the guides 32, and its parallel section supported at the cable cutting station 18.

By operating the chains 31 to move pallets into the apparatus to the end of the chain travel, and then reversing the chains to bring the dogs 42 back to the entrance end 15, more pallets can be brought in and accumulated on the rails to await carriage into the cable cutting station. Pallets accumulated on the rails are picked up and moved singly into the cable cutting station by the advancing rack 29.

Rack 29 consists of two bars 46, mounted for longitudinal reciprocating movement adjacent the rails 24. The bars have V-shaped guides 47 extending the lengths of their sides that ride in rollers 48 and 49, secured to the rails 24 and angle members 50, respectively, the angle members 50 forming part of the frame (see FIGS. 2B, 3B, 4 and 5). Each rack carries a plurality of spring biased dogs 51, similar to the dogs 42, which are equally spaced along the bars a distance greater than the width of a pallet, so that they may position one pallet at a station while positioning others at either side of the station.

Bars 46 are moved forward a distance equal to the spacing between dogs 51 to advance pallets along rails 24 and retracted to their original positions by means of fluid cylinders 52. Mounting plates 53 at one end of cylinders 52 are secured to frame legs 26 at the cable cutting station to hold the cylinders in place. Piston rods 54 are connected to bracket 55 depending from bars 46. Flow of fluid to and from cylinders 53 to actuate bars 46 and to advance pallets is controlled manually, as will be described.

Rack 29 will move pallets to and through the cable cutting station and into the inverting and tie removal station. Rack 30 will pick up empty ties from the inverting and tie removal station and advance them step-by-step along the remainder of the pallet path.

Rack 30 is very similar to rack 29, having bars 56 with V-guides 57 mounted for sliding movement in rollers 58 and 59 supported, respectively, on rails 24 and angle members 50. The bars carry dogs 60, which are spaced apart a much greater distance than the dogs 51 to provide greater spacing between the empty pallets for the manual pallet-preparing operations. Cylinders 61, mounted on frame legs 26 at the pallet preparing station 21, have their piston rods 62 connected to brackets 63 on the bars 56. Rack 30 differs from rack 29 in that bars 59 have extensions 64 at their ends adjacent the inverting and tie removal station that carry an end dog 65. Extensions 64 are of smaller cross-section than bars 56, and are unsupported by rollers. The extensions and dogs 65 are to enter the inverting and tie removing station to withdraw empty pallets after the ties have been removed.

Pallets on the path are brought first to the cable cutting station 18. The structure of that station appears in FIGS. 1, 2B, 3B, 4 and 5, and FIGS. 4 and 5 show the details on a larger scale.

Station 18 has an auxiliary frame 66 extending transversely across the main frame, consisting of pairs of spaced legs 67 rising on either side of the main frame and interconnected at their tops by a top beam 68. Top, intermediate and bottom plates 69, 70 and 71, respectively, span the respective pairs of legs and form mounting platforms at each side of the frame for the operating mechanism of the station.

Spaced, parallel slide rods 72 are supported at their ends in brackets 73 secured to the plates 69 and 70, with one pair of rods being at each side of frame 66. Each pair of rods slidably mounts a carriage 74, the carriage being composed of a base platform 75 having supports 76 projecting from its bottom and slidably mounted on rods 72 to permit the carriage to move along the rods. The carriage is moved by means of a cylinder 77 that is connected to plate 71 and has its piston rod 78 attached to the carriage.

Each carriage 74 carries a motor 79 having a cable cutting saw 80 fixed to its shaft 81. The motors, shafts and saws of the two carriages will be oppositely mounted so that the saws will be positioned inwardly of the carriages to overlie pallets on the pallet path at the station. The saws will be positioned to enter the pallets adjacent the headers, in the spaces between the headers and the ends of the concrete members. In the embodiment shown, the tie ends are inclined and the slide rods 72 are at an angle to the vertical to improve the entry positions of the saws. This arrangement would not necessarily be present in apparatus designed to remove concrete articles of different shape.

The saws are shielded by guards 82 mounted upon the shafts 81. The guard is substantially semi-circular, covering the upper half of the saw, but its backwall 83 extends downwardly at the sides to form pallet embracing arms 84. The arms have their facing edges parallel at the top, as at 85, and tapered at the bottom, as at 86, so that when a saw is lowered, a pallet which may be slightly misaligned will be engaged by one or the other of the tapered edges 86 and be cammed back into proper alignment to pass within the parallel area between the upper portions 85 of the arms 84 and be held against movement during the cutting operation. This will insure proper registration of the pallets with the saws and stability of the pallets during cutting.

The cables will be cut in alternation first one side then the other, as will be described, and the pallet moved by advancing rack 29 to the pallet inverting and tie removing station 19. FIGS. 1, 2B, 3B and 6 through 11 illustrate this station.

Pallet rails 24 and the main frame 13 are discontinuous at the station 19, but have their ends adjacent the station connected to opposite side of a special frame 87 at this station. This frame is erected upon a flat base 88 on which there is a pair of parallel I-beams 89, extending transversely of the apparatus. At each side, stanchions 90 rise vertically from the sides of beams 89. The stanchions on either side are bridged by plates 91, which form bases for the frame superstructure. On one side, an additional plate 92 provides a platform for a pallet inverting motor 93. The frame superstructure comprises pairs of uprights 94, resting upon each plate 91, bridged at their tops by beams 95. A transverse beam 96 extends completely across the apparatus, with its ends seated upon beams 95.

The platforms 91 carry bearings 97 in which shafts 98 are mounted. These shafts form part of rotating heads 99, which receive, and control, pallets at the station. One of the shafts is coupled to motor 93 by means of a clutch 100. Each rotating head is in the form of a vertically positioned disk 101, concentric to the shaft 98 on which it is mounted, and having a grooved block 102 on its inner face that seats spaced pallet rails 103. The rails are parallel to one another and equidistant on opposite sides of the projected axis of shaft 98. The rails are spaced apart such distance as to permit the headers of pallets to ride over them, with the header flanges 6 and 7 passing on opposite sides of the rails so as to confine the rails within the headers. A bearing plate 104 projects from each disk above the top rail 102, when the disks are in pallet-receiving position, to support the pallets when inverted and to take the pressure exerted upon the pallet during tie removal. The plate 104 may be suitably braced by gussets 105.

When a pallet is moved off of the end of the rails 24 into the inverting and tie removing station 19, the pallet headers will move in surrounding relation to the pallet rails 103. When the pallet is wholly within the station, it will lie wholly within a cylinder defined by the projected peripheries of the disks 101. If the motor 93 is started, the rotary head 99 connected to it will rotate and this rotation will be transmitted through the pallet to the rotary head 99 at the opposite end of the station. One-half revolution of the rotary heads will invert the pallets. In order to prevent the pallets from slipping out of the rotary heads during the inverting movement, arcuate wear plates 106 are mounted just below the projected cylinder of the rotating heads to provide a bearing surface for the pallet ends to retain their position. The arcuate wear plates are mounted upon beams 107 connected to the stanchions 90.

When the pallets have been inverted, their bottoms will be uppermost and the punch-out openings 11 will be on top. In order to remove the ties, punch-out cylinders 108 are pivotally connected, as at 109, to brackets 110 mounted on the underside of the transverse beam 96. The cylinder rods 111 have heads 112 of a size to pass freely through the openings 11 in the pallet to contact, and press out, the cast article. In order for the punch-out stroke of cylinder 108 to be a short one, the bottom of the cylinder is quite close to the pallet when the cylinder occupies a vertical position as shown in FIG. 9. This, however, requires that the pistons be moved from the vertical position during periods of rotation of the pallet. To this end, the cylinders 108 are connected to piston rods 113 of positioning cylinders 114 that are pivotally mounted on brackets 115 secured to the transverse beam 96. Operation of cylinders 114 will lift the punch-out cylinders 108 to an inoperative position, as shown in FIG. 7, completely outside of the rotating path of the pallets, and to a vertical position, as shown in FIG. 9, where the heads 112 are in position to enter the pallet openings 11 and press the casting from the pallet.

In order to prevent breakage of the concrete castings when they are free from the pallets, there are receiving arms 116 at the lowering station 22 which have an upper position wherein the casting seating surfaces 117 of the arms are just below the casting when in the pallet. The arms have a lower position in which the seating surfaces 117 are below the plane of a casting accumulating slide 118. A pair of the receiving arms 116 are shown, one being mounted beneath each end of the pallet position on a shaft 119 that has its ends journalled in bearings 120 fixed to an adjacent stanchion 90. Cylinders 121 are pivotally connected to brackets 122 secured to one of the I-beams 89, and have their piston rods 123 pivotally connected to the casting receiving arms. When the arms are in their upper positions, they will receive free castings and lower them onto the accumulating slide 118.

Slide 118 forms part of the tie, or other concrete casting, accumulating station 23. The slide consists of spaced rails 124 that are supported upon legs 125 so as to decline from a level just below the rotating heads 99 at the inverting station to just above ground level at the entrance end of the machine. The rails are formed of spaced channels 126 which supportt he actual slide rails 127. For most of the length of the slide, from the entrance end of the machine toward the inverting station, there are roller conveyors 128 mounted alongside and parallel to the slide rails 127. The tops of the rollers are slightly above the top of the slide rails, and castings moving down the slide will move freely by gravity along the roller section.

Castings lowered by the arms 116 onto the slide rails 127 are moved out of the inverting station area and down the slide by means of a pusher plate 129 actuated by a cylinder 130. Plate 129 is fixed to one end of a guide rod 131 journalled in a bearing 132 fixed to one of the channels 126. Cylinder 130 is fixed to a beam 133 that extends between the channels of adjacent slides. Piston rod 134 of the cylinder is connected to the guide rod 131 so that plate 129 will be moved longitudinally of the slide when the cylinder is actuated. There is one pusher plate assembly adjacent each of the slide rails.

After the casting is removed from the pallet, the rotating heads 99 are rotated to reverse the position of the pallet so that it is again right side up. The advancing rack 30 will then move forward and draw the now empty pallet from the inverting station and into the cable end removing station 20.

At the station 20 there is an end frame at each side of the main frame of the apparatus, consisting of spaced vertical posts 135 that are welded at their bottoms to the angle members 50 of the main frame 13. The posts are bridged at their top by a cross beam 136. Centrally of each beam 136 there is a bearing 137 in which trunnions 138 at the ends of a hammer mounting beam 139 are journalled. Beam 139 extends completely across the machine centrally of the cable end removing station. Near each end of beam 139 there is a bearing 140 for a shaft 141 on which the hammer 142 is freely swingable. The bearings 140 are so located that when the hammers hang vertically their driving plates 143 will be in contact with the inner faces of the headers of a pallet at the station. The hammers consist of spaced legs 144 pivotally mounted on shaft 141 and bridged by body plates 145, 146 and 147.

The driving plate 143 also bridges the legs at their free ends. The hammer is moved to and from cable striking position by means of cylinders 148 which are pivotally mounted on short girders 159 depending from the cross beam 136. Piston rods 150 of the cylinders are connected to the body plate 145.

Operation of the cylinders will lift the hammers to the full line position shown in FIG. 12 so that the pallet can move freely into place. It will be noted that there is another sword 151 at the station so that if a pallet has become displaced transversely of the apparatus it will be brought back into correct alignment as it enters the station. When the pallet is in place, the cylinders 148 are actuated, bringing the hammers down to strike simultaneous blows from opposite directions against the pallet heads. Driving plates 143 have sufficient area to strike all of the inwardly extending cable ends and drive them, and the chuck jaws of the anchors which grip them, outwardly to clear the cable openings. As the outwardly directed blows are opposite and simultaneous, there will be no movement of the pallet. The hammers will then be lifted. If they should not be lifted, the pallet nor the hammer structure will be damaged by movement of the pallet out of the station as the hammer supporting structure is free to swing laterally on the trunnions 138.

When the pallet leaves the station 20, rack 30 moves it to the preparation station 21 where, at its several stops, the pallet will be cleaned, oiled, have new cables inserted and the cables tensioned. These operations are performed manually to prepare the pallet to receive another casting.

Although there are no mechanical operations at the station 21, there is a frame 152 to suspend certain tools to facilitate the manual operations. The frame has legs 153 on either side of the main frame which are joined at the top by a horizontal, rectangular, I-beam surround 154, upon which a superstructure 155 is mounted. From the side edges of the superstructure trolley beams 156 extend horizontally the full length of the station 21. The opposite ends of trolleys 156 may be supported by the casting station (not shown) or in any other suitable manner. Rolled mounted carriages 157 ride on the trolley beams and carry tools, such as cable tensioning hydraulic jacks 158, which may be moved along the station for use where needed.

From the station 21, the pallet may be carried to another location for casting, or the casting station may adjoin the end of the station 21 to permit the prepared pallet to be moved directly into it.

Figure 14:
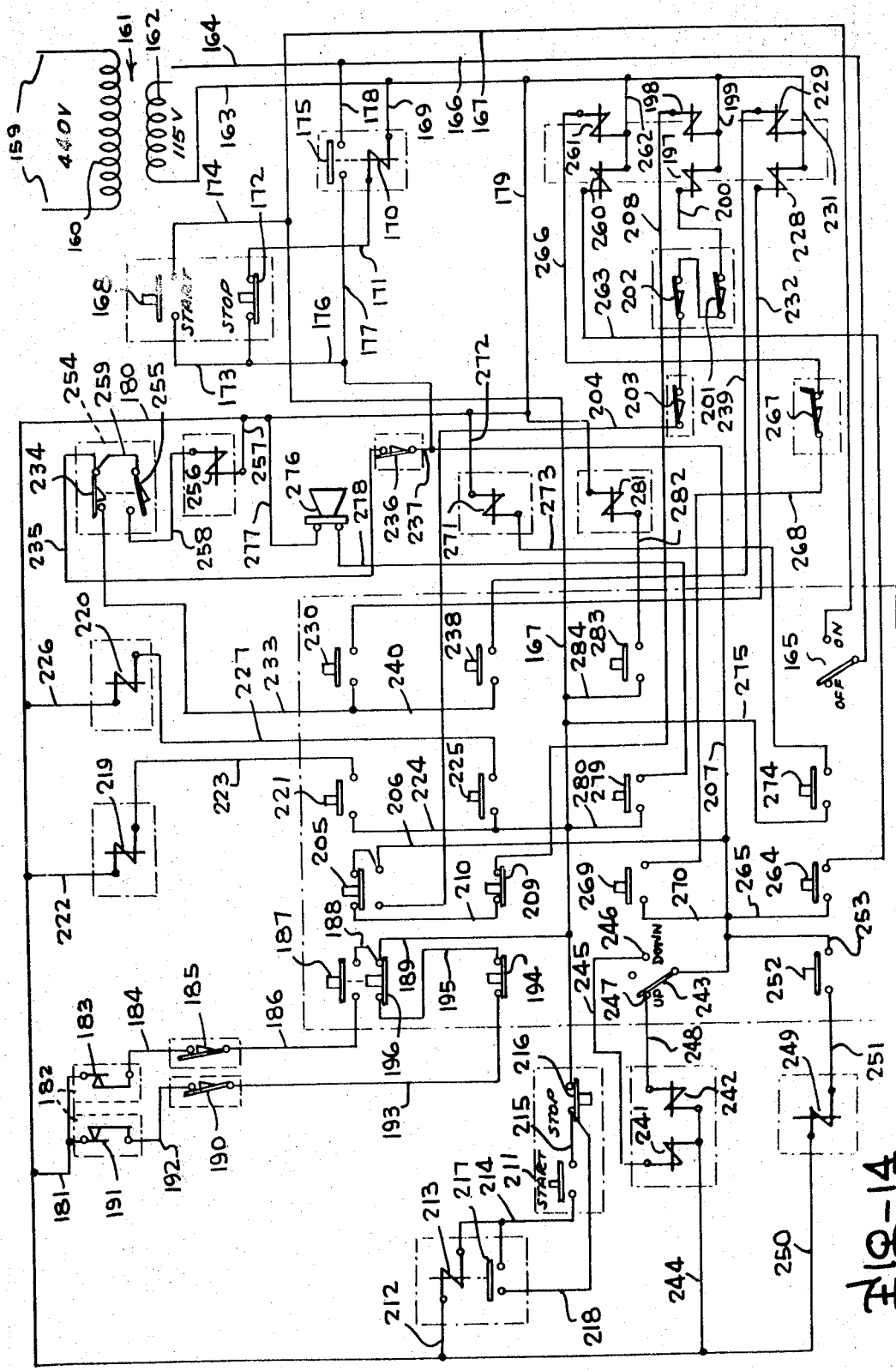
FIG. 14 is a diagram of the electrical control system for the apparatus.

All of the various mechanisms of the apparatus are controlled electrically by means of a circuit such as that shown in FIG. 14. Electricity from a suitable source 159 is carried through the primary coil 160 of a step down transformer 161, and the power to operate the control circuit is taken from the transformer secondary coil 162 through main lines 163 and 164. All of the control circuits are bridged across these lines.

Power from the main lines will be available to the control circuits by closing a main switch 165, which puts power in lines 166 and 167 that run to the various circuits. With switch 165 closed, a hydraulic pump starter button 168 can be closed to complete a circuit from line 163, line 169, pump starter holding coil 170, line 171, closed pump stop switch 172, line 173, now closed pump start switch 168, line 174 and lines 167, switch 165, and line 166 to line 164. This will energize coil 170 and close holding switch 175 and complete a pump holding circuit through line 163, line 169, coil 170, line 171, switch 172, lines 176 and 177, switch 175, line 178 and line 164. The pump circuit will remain closed until stop button 172 is pressed to break the circuit through holding coil 170.

When the hydraulic pump is operating, fluid under pressure will be available to operate the advancing racks 29 and 30, the accumulator plate 129, the punch-out cylinders 108, and the pallet inverting mechanism. The positioning of the punch-out cylinders 108, the movements of hammers 142 and the raising and lowering of the cable cutting saws is accomplished by air under pressure from any convenient source.

The pallet advancing chain 28 at the station 17 is manually started to advance pallets to the rack 29, but returns automatically to its starting position. The circuit for this includes power line 163, lines 79, 180 and 181, reversing relay 182, switch 183, line 184, closed limit switch 185, line 186, closed starter button 187, and lines 188, 189, 167, switch 165, and line 166 to line 164. When the chain dog reaches its limit of travel it will open switch 185, but, as switch 190 closed when the chain began its movement, a new circuit will be established through relay switch 191, line 192, switch 190, line 193, stop switch 194, line 195, switch 196 which closed when starter button 187 was released, and lines 189, 167, switch 165 and line 166 to line 164. When the dog reaches its original position, it will strike and open switch 190 and the motor starter will be reversed. As the starter button 187 is open, however, the chain will remain stationary.

Pallets advanced by cain 28 will be picked up and moved into the cable cutting station 18 by the advancing rack 29. The cylinders 52 that move the rack bars 46 are controlled to move the bars forwardly to pick up a pallet by solenoid valve 197, and reversely by valve 198. The circuit for the coil of valve 197 is from wire 163, wire 199, coil 197, line 200, limit switches 201, 202, 203, line 204, starter button 205 when depressed to close its lower contacts, wires 206, 207, 177, switch 175 and lines 178 and 164. Limit switches 201 and 202 are opened by the cable saw carriages 74 when lowered to prevent operation of the rack while the saws are in operation. Limit switch 203 is opened by the punch-out cylinders 108 when lowered to operating position. When the rack reaches its forward position, starter button 205 is released to move up to close its upper contacts. This breaks the circuit through the coil of valve 197 and establishes a circuit through the coil of reversing valve 198. This circuit includes wires 163, 199, coil 198, line 208, stop button 209, line 210, starter button 205 in its upper position, wires 206, 207, 177, switch 175 and lines 178 and 164. When the rack 29 completes its reversing movement, the pallet has been moved to the cable cutting station 18.

The two saw motors 79 are started simultaneously by depression of a single starter button 211. This button is in a circuit from wire 163 through lines 179, 180, 212, starter coil 213, line 214, button 211, line 215, closed stop button 216 and line 167, switch 165 and lines 166 and 164. Energizing coil 213 closes its switch 217 which closes a holding circuit through switch 217 and line 218 around starter button 211, so that when the starter button is released the saws will continue to operate until the stop button 216 is depressed to break the circuit.

The saw carriages are moved down to bring the rotating saws into contact with cables by reversing valves controlling the operation of cylinders 77. The valves are reversed by their solenoid coil 219 for one cylinder 77 and coil 220 for the other cylinder. The coil 219 is included in a circuit which is controlled by a button 221. The circuit is from line 163 through lines 179, 180, 222, coil 219, line 223, button 221, lines 224, 167, switch 165, and lines 166 and 164. When button 221 is released, the circuit is broken and the valve controlled by coil 219 reverses and the saw returns to its raised position.

The other saw is operated when button 225 is pressed. Its circuit includes lines 163, 179, 180, 226, coil 220, line 227, button 225, lines 224, 167, switch 165 and lines 166 and 164. This saw also returns to raised position when button 225 is released.

When a pallet reaches the inverting station 19 and is on the rails 103 of the rotating heads 99, motor 93 will be started to rotate the heads and invert the pallet. The motor is started to rotate in pallet inverting direction by coil 228, and is reversed by coil 229.

Coil 228 is energized by pressing button 230 in a circuit from line 163 through line 231, coil 228, line 232, button 230, line 233, normally closed contacts 234 of a limit switch which is reversed when the punch-out cylinders are in operating position, line 235, normally closed limit switch 236 which opens when advancing rack 30 is operated, lines 237, 177, switch 175 and lines 178 and 164.

The circuit through coil 229 for reverting the pallet to its upright position is controlled by button 238. The circuit includes lines 163, 231, coil 229, line 239, button 238, lines 240, 233, contacts 234, line 235, switch 236, lines 237, 177, switch 175 and lines 178 and 164.

The punch-out cylinder positioning cylinders 114 are operated by an air valve controlled by coils 241 and 242 energized by movement of a selector switch 243. Coil 241 controls movement of cylinder 114 to move the punch-out cylinders 108 to their down, operative position. Coil 242 controls raising cylinders 108.

Coil 241 is in a circuit from line 163 through lines 179, 180, 244, coil 241, line 245, contacts 246 and 243 of the selector switch, lines 207, 177, switch 175 and lines 178 and 164. When switch 243 is moved to close contact 247, coil 242 will be energized through a circuit including lines 163, 179, 180, 244, coil 242, line 248, contacts 247, 243 and lines 207, 177, switch 175 and lines 178 and 164.

The hydraulic valve for controlling operation of punch-out cylinders 108 is shifted by coil 249 to move the punch-out cylinders to press castings from pallets. This coil is in a circuit from line 163 through lines 179, 180, 250, coil 249, line 251, control button 252, and lines 253, 207, 177, switch 175, and lines 178 and 164. When the button 252 is released, the valve reverses to draw the cylinder plungers back to their inoperative positions.

The tie receiving arms 116 are lifted to receiving position by cylinders 121, which also lower the arms to deposit the castings on the slide 118. The lifting action takes place automatically when the punch-out cylinders are moved from their raised, inoperative positions to their lowered, vertical, operative positions above an inverted pallet. The receiver arm cylinders 121 are reversed to lower the arms 116 when the punch-out cylinders are brought back to inoperative position. This is accomplished by one of the punch-out cylinders striking a limit switch 254 on its downward movement to open the normally closed contacts 234 of that switch, which opens the circuits to the rotating heads 99 at the inverting station to prevent their operation during a punch-out, and close contacts 255 of switch 254 to complete a circuit through the receiver arm cylinder valve operating coil 256. The coil is in a circuit from wire 163 through wires 179, 180, 257, coil 256, wire 258, contacts 255, wires 259, 235, limit switch 236, lines 237, 177, switch 175 and lines 178 and 164. When the punch-out cylinders move to inoperative position, contacts 255 open to break the circuit through coil 256 and contacts 234 close to restore the rotating head circuits to ready condition. De-energization of coil 256 allows the cylinder valve for the receiving arms to return to position to lower the arms.

As previously mentioned, empty pallets are moved from the tie removing station and to subsequent stations by rack 30. Valves for the rack cylinders 61 are controlled by solenoid coils 260 and 261. Coil 260 advances the rack and coil 261 retracks it to pick up another pallet.

Coil 260 is in a circuit which includes lines 163, 262, coil 260, lines 263, push button 264, lines 265, 207, 177, switch 175 and lines 178 and 164. Coil 261 has a circuit from line 163 through line 264, coil 261, line 266, limit switch 267 which is opened when rotating heads 99 move to prevent movement of rack 30 into the inverting station, line 268, push button 269, lines 270, 207, 177, switch 175 and lines 178 and 164.

Movement of the rack 30 carries pallets to the cable and removing station 20 where the hammers are operated to drive out the cut cable ends. The hammer cylinders 148 are controlled by an air valve which is moved from its hammer raised position by means of a coil 271. When the coil is energized, the hammers are driven down by the cylinders 148, and when the coil is de-energized the hammers return to raised position. The circuit for coil 271 is from line 163 through lines 179, 180, 272, coil 271, line 273, push button 274, lines 275, 167, switch 165 and lines 166 and 164.

A warning device, such as a horn 276, may be provided to signal workmen that cut cable ends are to be driven out, so that the area on either side of station 20 can be cleared to prevent injuries. The horn may be activated through a circuit from line 163 through 179, 180, 277, horn 276, line 278, push button 279, lines 280, 167, switch 165 and lines 166 and 164.

The only remaining circuit is the one to activate the cylinders 130 to move pusher plate 129 and start removed castings down the slide 118 at the accumulating station 23. Here, again, a coil 281 moves an air valve to cause the cylinders to perform their operative movement, and the valve reverses and moves the parts to their inoperative position as soon as the coil is de-energized. The coil circuit includes lines 163, 179, coil 281, line 282, push button 283, lines 284, 167, switch 165 and lines 166 and 164. When button 283 is pressed, plates 129 will move down the slide, pushing the removed casting into the accumulating area.

In operating the device, the main switch 165 will first be closed to put power on the various circuits. Switch 168 will then be closed to start the hydraulic pump to provide hydraulic fluid pressure at the various hydraulic cylinders.

Pallets with cured ties in them will be placed upon the advancing chain 28 at the entrance end 15 of the apparatus. The pallets may be handled by a fork lift or other suitable means. The operator will press button 187 to start the chain and dogs 42 will engage the pallet and move it into the machine. As the dogs are properly aligned transversely of the machine, they will automatically square the pallet. As the pallet moves forward, its guide lug 12 will enter sword 44 and the pallet will be shifted transversely of the apparatus, if required, to complete the positioning operation. When a pallet has passed beyond the first dog 51 on the bars 46 of advancing rack 29, button 187 is released and the chain returns to its starting point. Button 205 is then pressed to actuate rack 29 and move the pallet into the cable cutting station 18. When the rack reaches its limit of movement, the pallet will be properly positioned at the station and the rack will automatically return to its position of rest. It will be noted that sword 44 extends to the edge of the station 18 so that the pallet will remain properly oriented when in the station.

Normally, push button 211 will be operated to start the saw motors 79 at the time the apparatus is put in operation, and the saws will rotate continuously. When there is a pallet in the saw station, the operator will press button 221 to start the right hand saw carriage 74 downward. As the saw 80 comes down it will first contact the upper two cables of the four cable pattern (see FIG. 5) and cut through them. Continued downward movement will cause the saw to contact and cut the lower two cables. Upon release of button 221, the carriage will return to its rased position automatically. The operator then presses button 225 to lower the left hand saw and cut the cables at that side of the pallet. After the cables are cut and the saws are again in raised position, the operator will press button 205 again to advance the pallet to the inverting and tie removing station 19 and to bring another pallet to the cable cutting station.

As the pallet moves in to the inverting station, it leaves the rails 24 and the pallet header flanges embrace, and move along, the rotating head rails 103 which will properly position the pallet and cause the pallet to be wholly supported by the rotating heads 99. In fact, the pallet forms a connecting link between the two heads 99. The operator will press button 230 to start motor 93 to rotate the heads 99 and the pallet between them. When the pallet is inverted, the rotation is stopped and the selector switch 243 is moved to the "down" position to lower the punch-out cylinders 108 to vertical position ready to press the casting from the pallet. Button 252 will then be pressed to actuate cylinders 108 to cause heads 111 to enter holes 11 in the pallet bottom and contact, and press out, the casting. It will be recalled that movement of the cylinders 108 to vertical position actuated switch 254 to energize the receiver arm circuit and cause arms 116 to raise to position to receive the casting as it leaves the pallet.

When button 252 is released, the punch-out heads retract, whereupon the operator can move the switch 243 to the "up" contact to swing cylinders 108 to inoperative position. As the cylinders swing up they leave switch 254 which reverts to its original position breaking the receiving arm circuit and allowing the arms 116 to lower the casting onto the slide 118. Pressing button 283 will cause pusher plates 129 to start the casting down the slide toward the accumulating area where it can be picked up for stockpiling.

The operator then returns the pallet to its original position by pressing button 238 to reverse the motor 93. After the pallet is right side up, it is moved from the inverting station and into the cable end removing station 20 by operation of rack 30. This is done by pressing button 269 to bring the rack extension dogs 65 into position at the back of the pallet, then pressing button 264 to advance the pallet. The pallet will be realigned by the sword 151 in making this advance if it has shifted transversely of the pallet path.

At the station 20, the hammers 142 are swung sharply down from their raised positions to strike the inner sides of the two headers to drive the cut cable ends and the anchor chucks that hold them out of the anchor bodies fixed to the pallet headers. The hammers swing in opposite directions and strike the headers simultaneously so that no movement of the pallet results. The hammers are caused to swing downwardly by pressing button 274. After the hammer blow is struck, the hammers return to raised position automatically.

Rack 30 is again actuated to move the pallet from the station 20 to the first stop at the preparing station 21. Here the pallet is cleaned and oiled, or other release agent applied. Another advance of rack 30 brings the pallet to the second stop of station 21 where cables are threaded through the anchors, the chuck jaws replaced, the strands stressed and cut to proper length. The trolley over the pallet path permits the carriages 157 with the jacks 158 to be moved freely to whatever point they may be needed along the path at station 21. The pallets are now ready to be moved to the casting station to receive another casting. Rack 30 can move the pallet directly from station 21 into the casting station if desired.

It will be understood that while the course of a single pallet has been followed through the apparatus, a number of pallets will be travelling along the pallet path in succession, with one being at each station at the same time so that full, continuous use of the equipment may be had. One operator can manipulate the control buttons to keep the various mechanisms in operation. Rack 30 can be operated to advance a pallet from the inverting and cable end removing station, and then rack 29 can be advanced to move pallets into the cable cutting and inverting stations. Following this, the mechanisms at the various stations can be put into motion.

While in the above one practical embodiment of the invention has been disclosed, it will be understood that details of construction shown and described are merely by way of illustration and the invention may take other forms within the scope of the appended claims.

What is claimed is:

1. An apparatus for removing cured concrete articles from pallets having bases with openings therein comprising only a small fraction of the total base area as said pallets are moved along a pallet path through an article ejecting station, said apparatus comprising a frame, means to move pallets in a single direction along said path to said station, a single pair of spaced heads mounted in said frame in face-to-face relation on opposite sides of the pallet path to engage and support the ends of pallets, means to rotate and invert pallets supported between said heads, article ejection means mounted on the frame overlying the pallet between said heads and having at least one extension depending therefrom, means to cause relative vertical movement between an inverted pallet supported by the heads and said ejection means so that said at least one extension passes through the openings in the base of the inverted pallet supported by the heads to engage and positively press the concrete article from the pallet.

2. An apparatus for removing cured concrete articles from pallets as claimed in claim 1 wherein, the article ejection means for pressing concrete articles from the pallets is movable from a position above a pallet in the heads to a position removed therefrom.

3. An apparatus for removing cured concrete articles from pallets as claimed in claim 1 wherein, the article ejection means for pressing concrete articles from the pallets is a fluid operated plunger pivotally mounted on the frame, and further comprising means to move the plunger from a position above a pallet supported in the heads to a position removed therefrom and return.

4. An apparatus for removing cured concrete articles from pallets as claimed in claim 1 further comprising, concrete article-receiving arms pivotally mounted on the frame for movement to and from a position beneath pallets in the heads to receive articles pressed from the pallets and lower them, and means to move the article-receiving arms.

5. An apparatus for removing cured concrete articles from pallets as claimed in claim 4 further comprising, a slide having a raised end positioned to receive articles lowered by the article-receiving arms, whereby articles may move to an accumulating point.

6. An apparatus for removing cured concrete articles from pallets as claimed in claim 5 further comprising, means to push articles deposited on the slide by the article-receiving means along the slide to move them toward an accumulating point.

References Cited

UNITED STATES PATENTS

| | | | |
|---|---|---|---|
| 2,070,533 | 2/1937 | Gathmann | 164—406 |
| 2,496,016 | 1/1950 | Nelson | 25—41 X |
| 2,741,797 | 4/1956 | Britton | 214—310 X |
| 2,954,596 | 10/1960 | Fassauer et al. | 25—2 X |
| 3,076,238 | 2/1963 | Rekart | 164—344 X |
| 3,149,392 | 9/1964 | Ripley | 25—2 X |
| 3,305,907 | 2/1967 | Baker | 25—118 (T)X |
| 2,402,368 | 6/1946 | Cantrall | 25—41 (L) |
| 2,713,710 | 7/1955 | Holland | 25—121 X |
| 3,070,857 | 1/1963 | Venus | 164—347 X |
| 3,196,513 | 7/1965 | Parma | 25—120 X |

J. SPENCER OVERHOLSER, Primary Examiner

B. D. TOBOR, Assistant Examiner

U.S. Cl. X.R.

25—41 D, 118 T; 249—67